United States Patent [19]

Jeshurun et al.

[11] Patent Number: 5,247,764

[45] Date of Patent: Sep. 28, 1993

[54] MOLDED, BRISTLED GLASS RETAINER

[75] Inventors: David R. Jeshurun, Birmingham; John K. Hill, Troy; Dwight A. Snelling, Birmingham; John R. Hall, Dearborn; Richard J. Shebib, West Bloomfield, all of Mich.

[73] Assignee: Ford Motor Company, Dearborn, Mich.

[21] Appl. No.: 935,700

[22] Filed: Aug. 26, 1992

[51] Int. Cl.⁵ .................................. E06B 7/16
[52] U.S. Cl. ........................ 49/495.1; 49/440; 428/120; 428/179
[58] Field of Search .............. 49/440, 441, 475, 495, 49/377; 428/179, 120

[56] References Cited

U.S. PATENT DOCUMENTS

| | | | |
|---|---|---|---|
| 1,978,438 | 10/1934 | Schlegel | 49/440 X |
| 2,021,972 | 11/1935 | Vogt | 49/440 X |
| 2,726,894 | 12/1955 | Bugbee | 49/441 |
| 2,847,247 | 8/1958 | Kramer | 49/440 |
| 3,018,015 | 1/1962 | Agriss et al. | 428/179 X |
| 3,604,153 | 9/1971 | Hess | 49/441 |
| 4,181,548 | 1/1980 | Weingarten | 428/178 X |
| 4,352,845 | 10/1982 | Miska | 49/475 X |
| 4,692,364 | 9/1987 | Altus | 428/179 X |
| 4,897,298 | 1/1990 | Otawa et al. | 49/441 X |

Primary Examiner—Philip C. Kannan
Attorney, Agent, or Firm—Roger L. May; Daniel M. Stock

[57] ABSTRACT

A resilient, supportive material provides low friction contact with moving parts, and includes a plurality of small diameter, resilient bristles disposed on at least one surface of a substrate. The plurality of bristles include at least a first and second group of bristles, where the first bristles of the first group have a first spring constant and a first bristle height for low friction contact with a moving part, and the second bristles in the second group have a second spring constant and a lower, second bristle height for low friction contact with a moving part. The second bristles in the second group are positioned to inhibit damage to the first group of bristles due to contact with a moving part which deviates from an intended path. As well, the first and second bristles provide two levels of resilient support to a part which is subjected to lateral forces. Where lateral forces are sufficiently high to compress the first bristles to the height of the second bristles, the second bristles compress to provide additional force in response to the applied force, while cushioning the part from damage.

19 Claims, 3 Drawing Sheets

MOLDED, BRISTLED GLASS RETAINER

BACKGROUND OF THE INVENTION

The present invention relates to materials having light weight and low cost, as well as superior low friction, energy absorption and dirt management characteristics, for use in automotive and equipment applications where parts move relative to each other. In particular, the present invention relates to a molded, bristled material which is particularly suited for use as a glass retainer in a channel, track or race in which glass is slidably disposed.

Of the numerous mechanical, moving parts in automobiles, sliding windows have long been the subject of improved operation. Typical concerns have focused on window movement with minimum effort; window tracking; sealing against the environment; energy absorption to protect the window during opening and closing, and to prevent rattles and squeaks; and grit management to prevent window scratching. These concerns have been addressed by various window channel designs.

Window channels in automobiles are known which incorporate resilient filaments which receive and seal at least part of a sliding window in a window opening. For example, Brueder, U.S. Pat. No. 2,878,056, issued Mar. 17, 1959, discloses a sliding window glass arrangement in which a brush-like member having filaments extending from a compressible mounting, extends across the bottom edge or belt of the window opening to engage the inner window surface.

More recently, automobile window openings for sliding windows, representatively shown in FIG. 1, have been provided with flocked, C- or J-shaped channels 10b disposed in metal supports 12, as shown in FIG. 2. This "sealing lip" design has been widely used, and is lightweight and inexpensive. The flocked surfaces provide good wear sealing, energy absorption, and grit management characteristics Flocking is well known in the art and comprises the addition of small fibers 14, such as polypropylene fibers, to the surface of a carrier, such as cloth, rubber or plastic. Flocking reduces the surface contact and, thus, the friction, between a moving window 16 and a channel 10 in which it moves.

Such flocked channels have been used in both the window openings and hidden window races 22a, 22b in automobile doors 20, shown in FIG. 1. Typically, the forward channel 10a is continuous with the forward window race 22a to maintain window alignment, while the rearward channel 10b is discontinuous with rearward window race 22b, to allow removal of the latter to facilitate window replacement and adjustment.

Although widely used, flocked channels 10 have, nonetheless, had some drawbacks in operation. Over time, the flocking fibers 14 wear off through contact with the window surfaces. Increased efforts are required to overcome the more intimate frictional contact with the carrier material, and window motor burnout occurs more easily. As well, the continuous contact between the window 16 and the channels 10a, 10b and races 22a, 22b causes the leading edge of the window 16 to propagate waves in the channels 10a, 10b (when moving upward) and races 22a, 22b (when moving downward) which add resistance to the window motion. The increased force required for window operation further contributes to window motor burnout. As well, the channel deformation which characterizes the resistant wave contributes to breaking down and wearing off the flocking, with the consequent effect on window motor burnout discussed above.

Accordingly, the need remains for further development of low-cost materials and designs which reduce the resistance to window motion, and which also exhibit energy absorption and dirt management characteristics. More generally, the need remains for continued development of materials and designs for automotive and equipment applications to reduce friction, wear and related problems arising from contact between moving parts.

SUMMARY OF THE INVENTION

The present invention satisfies that need by providing a material which may be used in window channels, as well as anywhere where two moving parts are brought into contact, to provide a cushioned surface for low friction contact.

A resilient, supportive material for low friction contact with moving parts is provided wherein a plurality of small diameter, resilient bristles are disposed on at least one surface of a substrate. The bristles are organized into at least two groups, preferably a first and second group of first and second bristles, which have different heights and different spring constants. A "two spring" design results. The tops or ends of all the bristles are preferably smaller than their bases, and provide low friction contact with a moving part in contact therewith. Preferably, the tops are flocked with small diameter fibers or are coated with a slip coating, depending on the application, to reduce frictional contact even further.

When applied to retain glass in automobile window channels or races, in accordance with a further aspect of the present invention, deflection of the bristles during glass cycling and door slams provides increased damping and self-cleaning. The bristles, further, reduce window efforts and retainer failures, and retain the advantages of flocking without the drawbacks of sealing lip designs.

The second group of bristles preferably are shorter and have a higher spring constant than the first group of bristles. The second, stiffer bristles of the two spring design are positioned to serve as ride bumps to protect the first group of bristles. Because the first group of bristles extend upward beyond the second group, they are subject to damage, tearing or shearing when a moving part deviates from its intended path to strike them laterally and low, towards the substrate, rather than near their ends. The second group of bristles, thus, are positioned to provide additional force to deflect a moving part and cause it to ride upward, back towards its intended path before it deviates sufficiently to damage the first group of bristles.

The two spring design of the present invention also enhances the energy absorption of the bristles by providing additional damping from the second bristles in the event high lateral forces compress the first bristles. The bristles also provide a degree of sound absorption, and permit moisture migration rather than moisture retention. Squeaks are reduced as the flexibility of the first bristles prevent wear which otherwise can occur between fixed parts, and the height of the second bristles reduces the overall contact.

In accordance with a further aspect of the present invention, means for supporting the material in contact with a moving part are further provided. By way of example and not limitation, the means for supporting may comprise a channel, race or other supporting element which is used to receive window glass in automobiles. In accordance with the present invention, the bristled material may be applied to such a supporting element to provide a resilient, supportive, low-friction surface for movement of the glass in the manner described above. The material of the present invention is particularly suited for such an application because it is both lightweight and easy to manufacture. The material may be disposed in the channel, race or supporting element such that the bristles contact at least one surface of the window glass, and/or at least one edge thereof.

Accordingly, it is an object of the present invention to provide a bristled material which is generally useful in providing a resilient, supportive, low friction surface for contact with moving parts. It is a further object of the present invention to provide a bristled, supportive, low friction material which has two groups of bristles which have different height and spring constants, such that a second group of bristles may be positioned to protect the first group of bristles from damage due to contact with moving parts. It is a further object of the present invention to provide a resilient, low friction surface which is also capable of cushioning another part to inhibit damage thereto upon the application of lateral forces. It is a further object of the present invention to provide a resilient, supportive, low friction material for contact with moving parts which is capable of energy absorption for cushioning, sound deadening or inhibiting squeaks and rattles. It is a further object of the present invention to provide a bristled, resilient, supportive, low friction material for contact with moving parts which has a cleaning capability for grit management of surfaces in which it contacts. These and other objects and advantages will be apparent from the drawings and detailed description which follow.

DETAILED DESCRIPTION OF THE PREFERRED EMBODIMENTS

Figure 1:
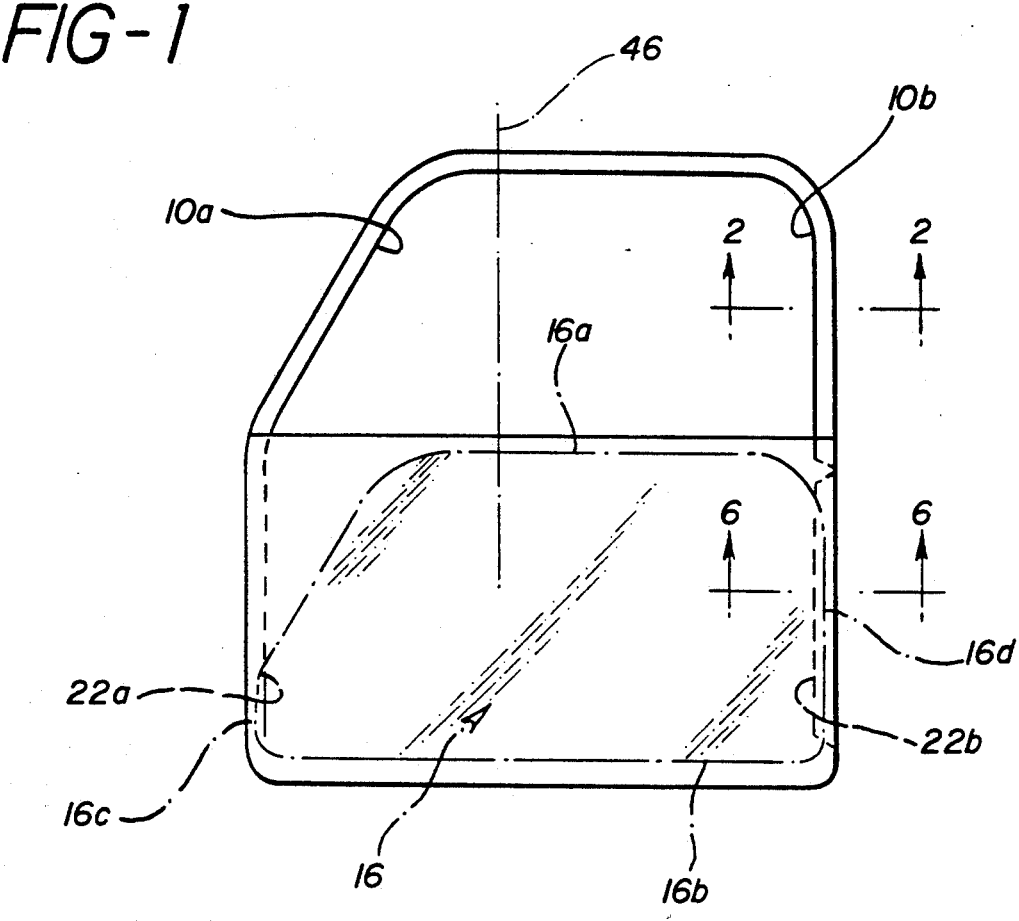
FIG. 1 is a side elevational view of the inside surface of a typical automobile door.
Figure 2:
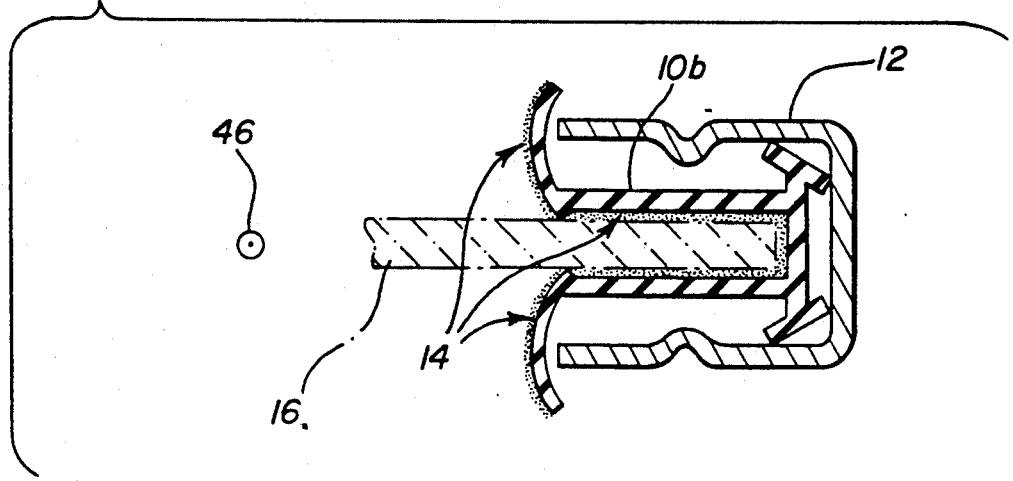
FIG. 2 is a partial cross-sectional view of the automobile door of FIG. 1 taken at line 2—2 showing a typical channel section in the prior art.
Figure 3:
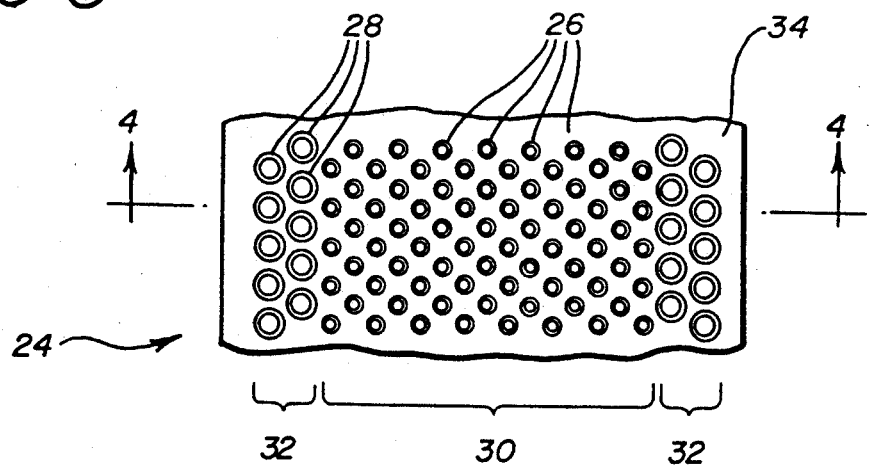
FIG. 3 is a top view of the material of the present invention.
Figure 4:
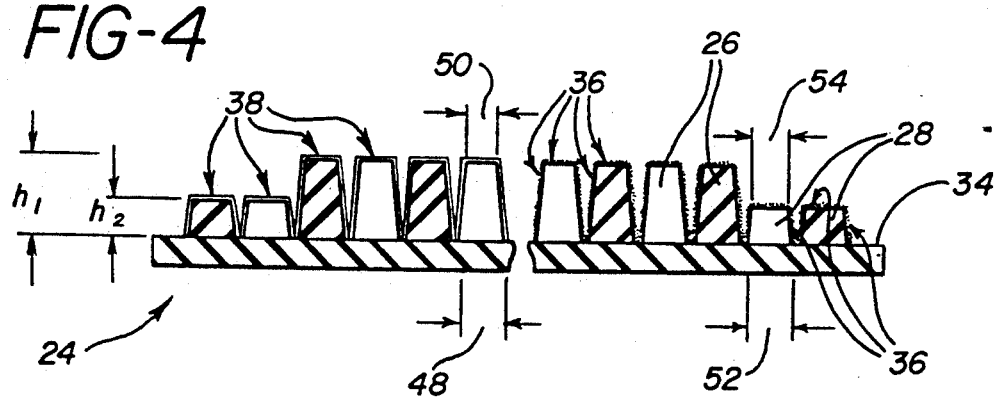
FIG. 4 is a front perspective view of the material of FIG. 3 taken along line 4—4, showing alternative treatments of the bristle ends.
Figure 5:
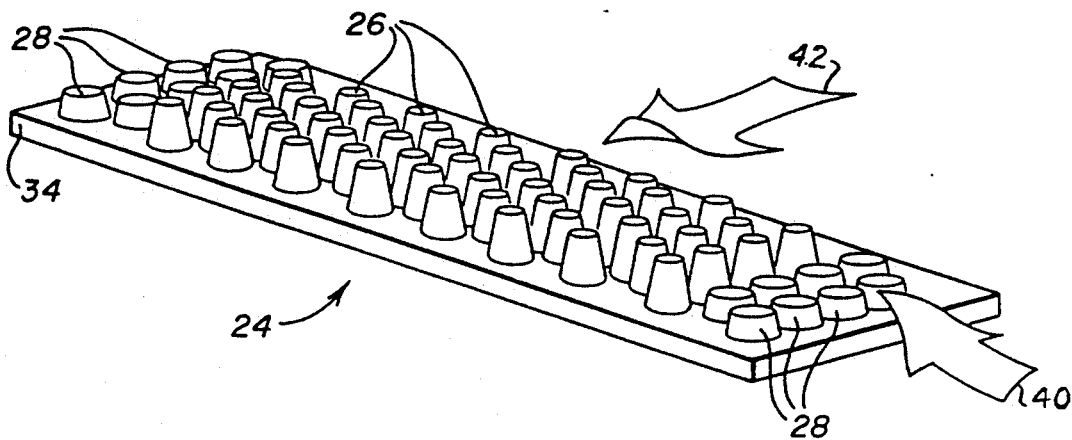
FIG. 5 is a schematic perspective view of the material of the present invention.

Referring to FIGS. 3–5, a resilient, supportive material 24 for low friction contact with moving parts is shown which comprises a plurality of small diameter, resilient bristles 26, 28 disposed on at least one surface of a substrate 34. The bristles are organized into at least two groups, preferably a first group 30 of first bristles 26, and second group 32 of second bristles 28 which, preferably, have different heights $h_1$, $h_2$ and different spring constants $k_1$, $k_2$. A two spring design results. The tops or ends of the bristles 26, 28 provide low friction contact with a moving part (not shown) in contact therewith. Preferably, the tops or ends of the bristles 26, 28 are truncated and are narrower than the bases of the bristles at the substrate 34.

To further reduce frictional contact with a moving part, it is preferred that at least the bristle ends are flocked with small diameter fibers 36, such as polypropylene fibers or other fibers known in the art. Alternatively, a slip coating 38 may be used to reduce friction. Slip coatings may be permanent films or coatings, or lubricants. The slip coating may be any suitable film, coating, or lubricant known in the art. In addition to the ends, the sides of the bristles 26, 28 are also preferably flocked or slip coated. Shown best in FIG. 4, flocking is well known in the art and typically involves adhesively applying the small diameter fibers to a surface. A preferred alternative is to eliminate flocking or slip coating, and make the bristles 26, 28 of low friction materials.

The second bristles 28, preferably, are shorter and have a higher spring constant $k_2$ than the first bristles 26. The second, stiffer bristles 28 of the two spring design are positioned to serve as ride bumps to protect the first group of bristles 30. Because the first group of bristles 30 extend upward beyond the second group of bristles 32, the first bristles 26 are subject to damage, tearing or shearing when a moving part deviates from its intended path and heads towards their bases, rather than their ends, to strike them low and laterally. The second group of bristles 32, thus, are positioned, as representatively shown in FIG. 5, to inhibit such damage and provide additional spring force to deflect a moving part and cause it to ride upward, back towards its intended path before it deviates sufficiently to damage the first group of bristles 30.

The direction of a moving part is indicated generally by the arrows 40 or 42 in FIG. 5, which illustrates the deflection caused by the second bristles 28. Moving parts coming from other directions (not illustrated) can equally be deflected by the second bristles 28 in like fashion.

The two spring design of the present invention also enhances the energy absorption of the bristles 26, 28 by providing additional damping from the second bristles 28 in the event high lateral forces compress the first bristles 26. That is, the first group of bristles 30 are elastically compressible to produce a force related to the first spring constant $k_1$ in response to applied forces, and when the first bristles 26 compress, or deflect to the height of the second bristles 28, the second bristles 28 are elastically compressible to produce an additional force related to the second spring constant $k_2$. The spring constant $k_2$ is, again, greater than the spring constant $k_1$. The spring-like nature of the first and second bristles 26, 28 may also be enhanced by the choice of materials from which they are made, and the related hardness or durometer value of the materials. However, the durometer values can vary based on the particular application. Thus, the material choices for the present invention provide added flexibility in design.

To provide further flexibility in design, the geometry of the bristles 26, 28, their spacing, and their composition may be varied to satisfy the needs of various environments and applications. The preferred embodiment is shown in FIGS. 3-5. Preferably, the bristles 26, 28 in the material 24 of the present invention are disposed in a plurality of rows, with the bristles of adjacent rows in off-set relationship to more evenly support parts gliding on the bristle ends. The preferred height $h_2$ of the second bristles 28 is approximately 50% that of the first bristles 26. Further, the bristles 26, 28 are preferably tapered cylinders, wider at their bases adjacent the substrate 34, and have truncated ends. However, other shapes are possible, such as straight cylindrical or stepped bristles, multifaceted tapered bristles, substantially pointed bristles, and other shapes. As well, while bristles 26, 28 of circular cross-section are shown in FIGS. 3-5, the bristle cross-sections may equally have other shapes, such as oval and elliptical.

As tapered cylinders, the first bristles 26 preferably include a first bristle diameter 48 at the base or end substantially adjacent to the substrate 34, and a second bristle diameter 50 at the top or end farthest from the substrate 34. The second bristles 28 preferably include a third bristle diameter 52 at the base or end substantially adjacent to the substrate 34, and a fourth bristle diameter 54 at the top or end farthest from the substrate 34. Regardless of the exact bristle size, in accordance with the present invention, the third and fourth bristle diameters 52, 54 are greater than the first and second bristle diameters 48, 50, respectively. The spacing between bristles varies depending on the application. As shown in FIG. 3, the bristles are spaced apart approximately two first bristle diameters, center to center.

Flexibility in design is further illustrated by the ability to variously group and position the first and second bristles 26, 28 for a particular application to achieve the desired resilience, support and low frictional contact between the first group of bristles 30 and a moving part, while providing protection and resilience with the second group of bristles 32. For example, as shown in FIGS. 3 and 5, the first group of bristles 30 may be organized into a generally rectangular strip, with the second group of bristles 32 disposed in at least one row along at least one side thereof. As shown in FIGS. 6-9 for a particular application, the second group of bristles 32 may be disposed parallel to, or at an angle to, the intended direction of a moving part, between one or several groups of first bristles 30. Further, groups of bristles 26, 28 may be separated by blank areas on the substrate 34, as shown in FIGS. 6-9

Additional flexibility in design is afforded by the numerous resilient compounds from which the material 24 of the present invention may be made. The material 24 is preferably comprised of compatible, low cost materials, with the substrate 34 and at least one of the bristles 26, 28 preferably formed of the same or material for low cost production. It is preferred to extrude or injection mold the material 24. However, other techniques for producing the material 24 from resilient materials are understood to be within the scope of the present invention.

Preferred resilient, low durometer materials for practicing the present invention include ethylene propylene diene monomer (EPDM) which is generally available commercially, and Sanaprene:TM which is commercially available from Monsanto Corporation, St. Louis, Mo. Preferred, higher durometer materials for practicing the present invention include resilient materials which tend to maintain their cross-sectional properties, such as "rigid" polypropylene which is generally available commercially, and "rigid" Sanaprene TM . It is understood that the invention is not limited to these materials, and other resilient materials having the desired properties, for example, some polyvinyl chlorides, may be used.

While it is understood that the substrate 34 and first and second bristles 26, 28 may be made of different materials having different resilient characteristics, it is preferred that the geometry of the first and second bristles 26, 28 be the defining factor which establishes the different spring constants $k_1$, $k_2$ associated with the bristles.

In accordance with a further aspect of the present invention, means for supporting the material in contact with a moving part are further provided By way of example and not limitation, FIGS. 1 and 6-9 illustrate a means for supporting comprising a channel 10, race 22 or other supporting element which is used to receive window glass in automobile doors. In accordance with the present invention, the bristled material 24 may be applied to such a supporting element to provide a resilient, supportive, low-friction surface for movement of the window 16 in the manner described above.

When applied to retain glass in automobile window channels 10 or races 22, deflection of the bristles 26, 28 during glass cycling and door slams provides increased damping and self-cleaning. When the glass is at rest, deflection of the bristles further eliminates rubbing between surfaces due to vibration which produces squeaks and noise. The bristles 26, 28, further, reduce the effort required to open and close the window 16, and retain the advantages of flocking (or alternatively, slip coating), without the drawbacks of sealing lip designs. Retainer failures are, thus, reduced. The moving window 16 cyclically reciprocates in the door in opposite directions generally parallel to a first axis, indicated at 46.

The material 24 is particularly suited for such an application because it is also lightweight, inexpensive, and easy to manufacture. Lightweight materials are favored in automotive applications because of fuel economy restrictions. In such an application, the material 24 of the present invention is preferably flocked to reduce friction.

It is preferred, in the particular example illustrated, that the first bristles 26 to have low durometer values in the range of approximately 60 to 80, while the second bristles have durometer values greater than 80. Generally, in such applications, it is desired that the resilient material of the first bristles 26 has a low durometer value similar to that of materials conventionally used in channels and glass runs, while the resilient material of the second bristles 28 has a durometer value which may be considered substantially rigid. By way of example, suitable materials include, but are not limited to EPDM elastomer or Sanaprene TM for the first bristles 26, and "rigid" polypropylene or "rigid" Sanaprene: TM for the second bristles 28, and any of these for the substrate 34.

The preferred geometry, in the application shown, is preferably that the first bristles 26 have a height, $h_1$, which is approximately twice that of second bristles 28. The height, $h_1$, is preferably approximately 4 mils. The first bristles 26 preferably taper from a first bristle diameter 48 of approximately 2 to 2.25 mils to a second bristle diameter 50 of approximately 1.25 mils, while the second bristles 28 taper from a third bristle diameter 52 of approximately 4 to 4.5 mils to a fourth bristle diameter 54 of approximately 2.5 mils. The substrate 34 may vary in thickness as required to support the bristles 26, 28. The rows of bristles are preferably off-set and the bristles spaced apart approximately two first bristle diameters 48, center-to-center.

As shown in the application of FIGS. 6–9, the material 24 may be used such that the first group of bristles 30 provide resilient, low-friction support to at least one surface of the moving window glass 16, as well as to at least one edge thereof. As may be understood by reference to the drawings, more than one edge of the window 16 may be in contact with the material 24. The second bristles 28 are variously located in FIGS. 6–9 to prevent damage, such as tearing or shearing, to the first bristles 26 by the edges of the window 16 should it deviate from its intended path while cycling.

For example, assuming material 24 is disposed in run 22a or 22b, edge 16b of the window 16 contacts such material 24 as window 16 is lowered. Similarly, assuming material 24 is disposed in channel 10a or 10b, edge 16a contacts such material 24 as window 16 is raised. In addition, during operation, edges 16c and 16d also contact any material 24 disposed in race 22a, race 22b, channel 10a or channel 10b, respectively. The potential for damaging contact between these edges and the first bristles 26 is inhibited by the use of the second bristles 28 which, thereby, preserve the resilient, supportive low-friction contact which characterizes the material 24 of the present invention.

Figure 6:
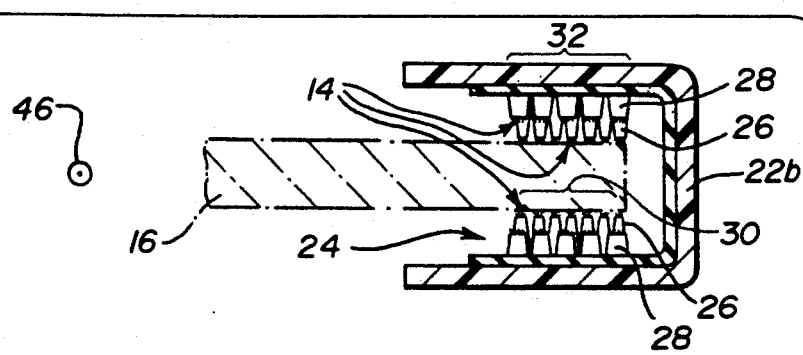
FIGS. 6-9 are partial cross-sectional views of the automobile door of FIG. 1 taken at line 6—6, showing the present invention applied in alternative configurations to the illustrative example of a window glass race.
Figure 7:
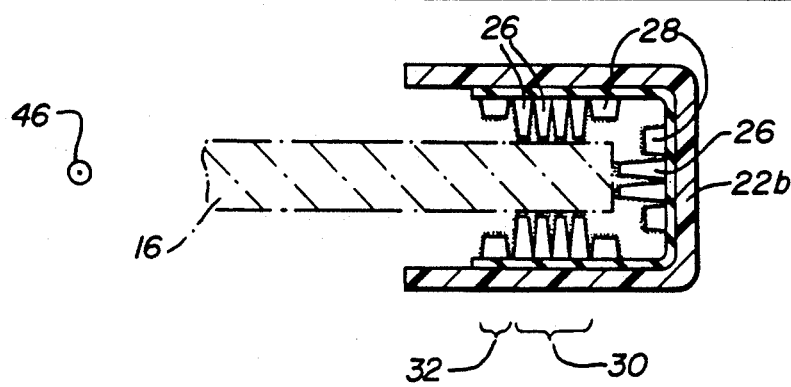
Figure 8:
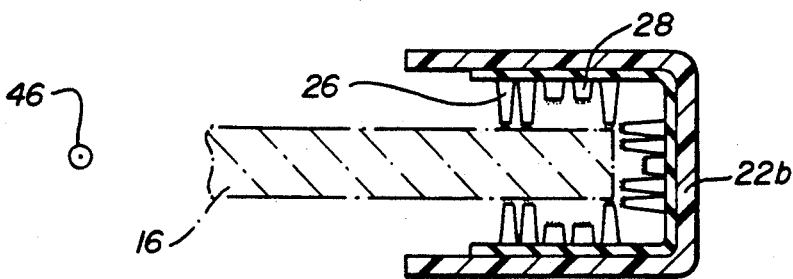
Figure 9:
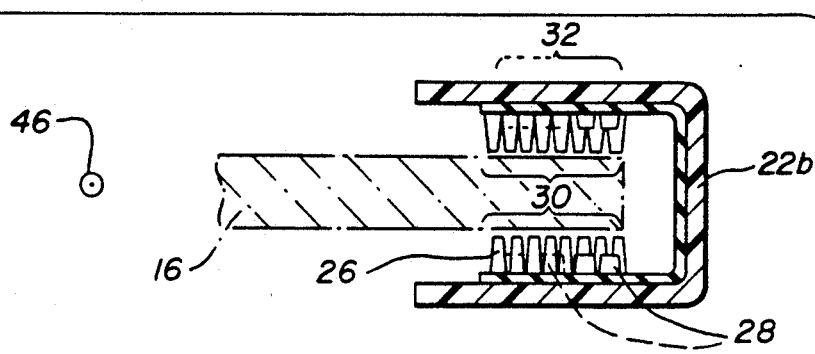

As more particularly shown in FIGS. 6 through 9, the first and second bristles 26, 28 can be organized in first and second groups of bristles 30, 32 in various ways to achieve the ends sought. As shown in FIG. 6, second bristles 28 may be placed in second groups of bristles 32 which extend across the path of the window 16. FIGS. 7 and 8 show alternative configurations in which the second bristles 28 in groups 32 are aligned side by side, generally parallel to the path of the window. FIG. 9 shows the placement and alignment of second groups of bristles 32 at a diagonal angle to the path of the window 16. More than one first and one second group of bristles 30, 32 may be used in any particular configuration or application using material 24.

The material 24, in the example of FIGS. 1 and 6–9, also provides cushioning to protect the glass of window 16 from damage due to lateral forces during closing and opening of the door 20. The material 24 serves, as well, to deaden noises and prevent squeaks and rattles in the door 20. That is, the bristles 26, 28 are preferably made of elastomeric material, which is also provides a degree of sound absorption, and the spacing between the bristles 26, 28 further permits moisture migration, inhibiting moisture build-up which may lead to squeaks. Squeaks are also reduced as the flexibility of the first bristles 26 reduces wear between fixed parts which produces squeaks. The deflection of the first bristles 26 (and second bristles 28, if in contact with the window 16,) provide grit management, and flick dirt and grit from the window surface(s) in the course of contact therewith.

While certain representative embodiments and details have been shown for purposes of illustrating the invention, it will be apparent to those skilled in the art that various changes in the articles disclosed herein may be made without departing from the scope of the invention, which is defined in the appended claims.

What is claimed is:

1. A resilient, supportive material for low friction contact with moving parts, said material comprising:
    a substrate;
    a plurality of small diameter, resilient bristles disposed on at least one surface of said substrate, said plurality of bristles comprising at least a first and second group of bristles, wherein:
    each of said bristles in said first group have a first spring constant and a first bristle height for low friction contact with a moving part; and
    each of said bristles in said second group have a second spring constant higher than said first spring constant and a second bristle height lower than said first bristle height for low friction contact with a moving part, and wherein said bristles in said second group are positioned to inhibit damage to said first group of bristles from contact with a moving part.

2. The material of claim 1 wherein said substrate and said bristles are integrally formed.

3. The material of claim 1 wherein the geometry of said first and second bristles define said first and second spring constants.

4. The material of claim 1 wherein said first and second bristles are composed of different resilient substances which provide different first and second spring constants therein.

5. The material of claim 1 wherein said first group of bristles are elastically compressible to produce a force related to said first spring constant in response to compressive forces generally perpendicular to said substrate, and said second bristles are elastically compressible to produce a force related to said second spring constant in response to compressive forces when said first bristles compress to said second bristle height.

6. The material of claim 1 wherein said bristles are disposed in a plurality of rows, and said bristles in adjacent rows are in off-set relationship.

7. The material of claim 1 wherein said first bristles are disposed in a generally rectangular strip and said second bristles are disposed in at least one row along at least one side of said generally rectangular strip.

8. The material of claim 1 wherein said bristles have ends which are substantially truncated.

9. The material of claim 1 wherein said bristles have a wider cross-sectional area substantially adjacent said substrate and a narrower cross-sectional area at the ends farthest from said substrate.

10. The material of claim 9 wherein said bristles are tapered cylinders and:
    said first group of bristles include:
        a first bristle diameter in the range from approximately 2 to 2.25 mils at the end substantially adjacent to said substrate; and
        a second bristle diameter in the range from approximately 1 to 1.25 mils at the end farthest from said substrate; and
    said second group of bristles include:
        a third bristle diameter in the range from approximately 4 to 4.5 mils at the end substantially adjacent to said substrate; and
        a fourth bristle diameter in the range from approximately 2 to 2.5 mils at the end farthest from said substrate;
    wherein said third and fourth bristle diameters are greater than said first and second bristle diameters, respectively.

11. The material of claim 1 further comprising one of a flocking material and a slip coating attached to the ends of at least said first group of bristles.

12. A resilient, low friction support for moving parts, said support comprising:
    a resilient supportive material for low friction contact with moving parts, said material comprising:
        a substrate;

a plurality of small diameter, resilient bristles disposed on at least one surface of said substrate, said plurality of bristles comprising at least a first and second group of bristles, wherein:

each of said bristles in said first group have a first spring constant and a first bristle height for low friction contact with a moving part; and each of said bristles in said second group have a second spring constant higher than said first spring constant and a second bristle height lower than said first bristle height for low friction contact with a moving part, and wherein said bristles in said second group are positioned to inhibit damage to said first group of bristles from contact with a moving part; and means for supporting said material in contact with a moving part.

13. The material of claim 12 wherein the geometry of said first and second bristles define said first and second spring constants.

14. The material of claim 12 said first group of bristles are elastically compressible to produce a force related to said first spring constant in response to compressive forces generally perpendicular to said substrate, and said second bristles are elastically compressible to produce a force related to said second spring constant in response to compressive forces when said first bristles compress to said second bristle height.

15. The material of claim 12 wherein said means for supporting comprises:

a channel section shaped to receive at least a portion of one edge of a moving window which cyclically reciprocates in opposite directions generally parallel to a first axis; and means for connecting said material to said channel section such that at least one of said plurality of bristles are positioned to contact a moving window therein.

16. The material of claim 15 wherein said second group of bristles are disposed in at least one row positioned generally parallel to said first axis.

17. The material of claim 15 wherein said second group of bristles are disposed in at least one row positioned generally at an angle to said first axis.

18. The material of claim 15 wherein:

said first bristle height is higher than said second bristle height;

said first spring constant is lower than said second spring constant; and said second group of bristles are positioned to receive said portion of at least one edge when the movement of said moving window deviates from generally parallel to said first axis in at least one direction towards said material;

whereby said second group of bristles may resiliently deflect said moving window and inhibit damage to said first group of bristles.

19. The material of claim 15 wherein said material is further positioned to contact at least a portion of one surface of said moving window.

* * * * *